(12) United States Patent
Ishii et al.

(10) Patent No.: US 8,983,252 B2
(45) Date of Patent: Mar. 17, 2015

(54) OPTICAL CIRCUIT AND OPTICAL SIGNAL PROCESSING APPARATUS USING THE SAME

(75) Inventors: Motohaya Ishii, Atsugi (JP); Naoki Ooba, Atsugi (JP); Kenya Suzuki, Atsugi (JP); Shinji Mino, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1134 days.

(21) Appl. No.: 12/741,194

(22) PCT Filed: Nov. 14, 2008

(86) PCT No.: PCT/JP2008/070798
§ 371 (c)(1),
(2), (4) Date: Jul. 19, 2010

(87) PCT Pub. No.: WO2009/063986
PCT Pub. Date: May 22, 2009

(65) Prior Publication Data
US 2010/0296776 A1 Nov. 25, 2010

(30) Foreign Application Priority Data
Nov. 15, 2007 (JP) .................................. 2007-297299

(51) Int. Cl.
*G02B 6/30* (2006.01)
*G02B 6/32* (2006.01)
*G02B 6/12* (2006.01)

(52) U.S. Cl.
CPC ........ *G02B 6/30* (2013.01); *G02B 2006/12102* (2013.01); *G02B 6/32* (2013.01); *G02B 6/12011* (2013.01); *G02B 6/12019* (2013.01); *G02B 6/327* (2013.01)
USPC .................... 385/49; 385/14; 385/33; 385/37

(58) Field of Classification Search
USPC ..................................................... 385/33, 129
See application file for complete search history.

(56) References Cited

U.S. PATENT DOCUMENTS

| | | | |
|---|---|---|---|
| 5,799,118 A | * | 8/1998 | Ogusu et al. ..................... 385/14 |
| 6,122,419 A | | 9/2000 | Kurokawa et al. |

(Continued)

FOREIGN PATENT DOCUMENTS

| | | |
|---|---|---|
| EP | 1 445 631 | 8/2004 |
| JP | 05-333243 | 12/1993 |

(Continued)

OTHER PUBLICATIONS

International Preliminary Report on Patentability issued in counterpart PCT Application PCT/JP2008/070798 on Jul. 8, 2010.

(Continued)

*Primary Examiner* — Michelle R Connelly
(74) *Attorney, Agent, or Firm* — Workman Nydegger

(57) ABSTRACT

Conventionally, there has been a problem that a structure in which optical signals outputting from a substrate facet in a PLC are optically coupled to a different bulk type optical device is so complicated that its assembly is laborious. There also has been a problem that a structure in which an output facet of a PLC is polished with an angle results in an increase in coupling loss in free space optics. With a lens bonded to an angled facet of a PLC, an optical circuit of the present invention achieves an optical coupling, with low loss, to a bulk-type optical device or another PLC with a simple structure. Moreover, a lens part and an optical fiber part are respectively bonded to different core apertures exposed on a single angled facet. Thereby, optical signals can be inputted to and outputted from the PLC through the single facet.

13 Claims, 11 Drawing Sheets

(56) References Cited

U.S. PATENT DOCUMENTS

| | | |
|---|---|---|
| 6,456,760 B1 | 9/2002 | Kurokawa et al. |
| 6,839,492 B2 * | 1/2005 | Kwon et al. ............... 385/50 |
| 7,174,063 B2 * | 2/2007 | Doerr et al. ............... 385/14 |
| 7,212,704 B2 * | 5/2007 | Ducellier ................... 385/16 |
| 7,289,697 B2 | 10/2007 | Dorrer et al. |
| 7,386,206 B2 * | 6/2008 | Tabuchi et al. ............ 385/37 |
| 2002/0001432 A1 * | 1/2002 | Ueda ........................ 385/37 |
| 2003/0103729 A1 * | 6/2003 | Ishida ....................... 385/49 |
| 2003/0185501 A1 * | 10/2003 | Kwon ........................ 385/24 |
| 2004/0151432 A1 * | 8/2004 | Tabuchi et al. ............ 385/37 |
| 2004/0165817 A1 | 8/2004 | Nakagawa et al. |
| 2007/0223552 A1 * | 9/2007 | Muendel et al. .......... 372/50.12 |
| 2007/0237451 A1 * | 10/2007 | Colbourne ................. 385/18 |

FOREIGN PATENT DOCUMENTS

| | | |
|---|---|---|
| JP | 07-120629 | 5/1995 |
| JP | 10-050968 | 2/1998 |
| JP | 2001-116944 | 4/2001 |
| JP | 2001-350046 | 12/2001 |
| JP | 2002-250828 | 9/2002 |
| JP | 2002-328243 | 11/2002 |
| JP | 2004-239991 | 8/2004 |
| JP | 2004-254089 | 9/2004 |
| JP | 2006-106769 | 4/2006 |
| JP | 2006-126658 | 5/2006 |
| JP | 2006-243736 | 9/2006 |
| JP | 2008-216905 | 9/2008 |

OTHER PUBLICATIONS

International Preliminary Report on Patentability and Written Opinion issued in PCT Application No. PCT/JP2008/070798 on May 27, 2010.

* cited by examiner

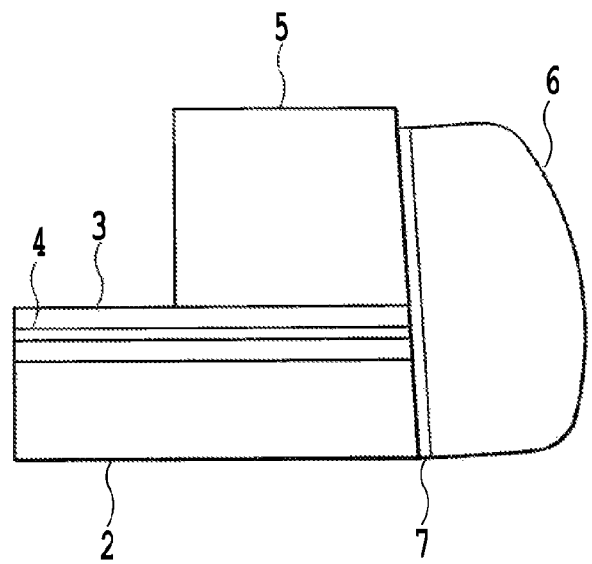
FIG.2A
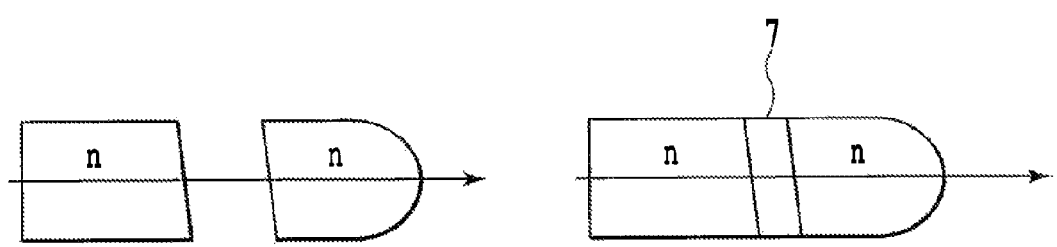
FIG.2B  FIG.2C

OPTICAL CIRCUIT AND OPTICAL SIGNAL PROCESSING APPARATUS USING THE SAME

TECHNICAL FIELD

The present invention relates to an optical circuit used for optical signal processing. More specifically, the present invention relates to an optical circuit in an optical signal processing apparatus provided with a bulk type optical device.

BACKGROUND ART

Optical communication networks which are becoming faster in speed and larger in capacity have resulted in an increased need for apparatuses for performing optical signal processing typified by processing of optical signals in the form of wavelength division multiplexing (WDM). For example, such a function is demanded with which network route switching is performed at a node on a multiplexed optical signal which has not undergone optical to electrical conversion and hence which is still an optical signal. Thereby, transparent networks are under development.

Meanwhile, waveguide-type optical circuits (PLC: Planar Lightwave Circuit) have been researched and developed from the view points of size reduction and integration of optical signal processing apparatuses. In a PLC, for example, cores made of silica glass are formed on a silicon substrate, and various functions are integrated on a single PLC chip. Thereby, an optical functional device with low loss and high reliability has been achieved. Moreover, there exist composite optical signal processing devices (apparatuses) in each of which multiple PLC chips and other optical functional devices are combined.

For example, Patent Document 1 discloses an optical signal processing apparatus in which a waveguide-type optical circuit (PLC) including an arrayed-waveguide grating (AWG) and the like is combined with a spatial light modulator such as a liquid crystal device. Specifically, studies have been carried out on wavelength blockers each formed of a PLC and a collimating lens which are symmetrically arranged about a liquid crystal device, wavelength equalizers, dispersion compensators, and the like. Such optical signal processing apparatuses perform optical signal processing on multiple optical signals with different wavelengths independently of each other on a wavelength basis.

In an optical signal processing apparatus using a PLC, it is necessary to optically couple various bulk type optical devices to a PLC, or PLCs to each other. In general, for establishment of optical connection of a bulk type optical device or the like in free space optics, it is necessary to convert optical signals propagating in atmosphere into collimated beams (parallel beams) and then to input and output the collimated optical signals for the purpose of preventing loss due to widened optical signals. Moreover, the collimated beams need to have an appropriate predetermined beam diameter in accordance with optical characteristics of the bulk type optical device. For this end, for example, a collimating lens or the like is used.

FIG. 10 is a drawing showing a part of a structure of a conventional optical signal processing apparatus using a PLC. In the structure shown in FIG. 10, a cylindrical lens is used to collimate output light from a facet of the PLC. The optical signal processing apparatus in FIG. 10 has a structure in which optical devices are sequentially fixed in alignment with an optical base plate 106 taken as a reference. A PLC 101 and a cylindrical lens 102 are fixed to optical alignment parts 103a, 103b, and 104, for example, by caulking into metal plates, such as stainless steel plates, or metal frames or by using a low-melting glass, a solder, an adhesive, or the like. Here, the optical alignment part 103a and the optical alignment part 103b may be a single integrated part. In FIG. 10, a side face portion is not shown so that the cylindrical lens 102 can be seen. A part may be provided to the side face portion. The above-described PLC 101 and cylindrical lens 102 are respectively fixed to metal bases 105a and 105b. The bases 105a and 105b can slide on the optical base plate 106, so that their positions on a plane can be adjusted. The bases 105a and 105b are provided with joint portions which allow also heights and facing directions of the bases 105a and 105b to be adjusted to some extent. An optical signal 100 inputted to the PLC passes through the cylindrical lens 102, and is outputted as collimated beams.

The above-descried structure of the conventional technique requires the following assembly processes of the optical signal processing apparatus. Specifically, the assembly processes include a process of fixing the PLC 101, the lens 102, and the like to the optical alignment parts 103a, 103b, and 104 with an adhesive or the like; a process of fixing these optical alignment parts to the bases 105a and 105b; and further a process of aligning and fixing these bases to the optical base plate 106. In some cases, it is also necessary to fix the bases to the optical base plate by YAG laser welding or the like. Operation for each of these processes is complicated and time consuming.

In the above-described structure of the free space optics, ends from which optical signals output are exposed to a space. Hence, it is necessary to form anti-reflection coatings on output facets of the lens 102 and the PLC 101. Condensation or dust adhesion may occur between the output facet of the PLC 101 and the lens. Moreover, it is necessary to make a mechanical design in accordance with weights of all mechanical parts and in consideration of vibration. Moreover, when the output facet of the PLC is polished with an angle in order to prevent return light from occurring at the facet, there has been a problem that the following coupling loss occurs.

FIG. 11 is a diagram of behavior of output beams at and around a facet of a PLC of a conventional technique when viewed from a side face of a substrate. The facet of the PLC 101 is polished more toward an upper surface of the PLC substrate so that the facet can be angled slightly. Suppose a case where optical signals output from this angled facet of the PLC. If an air gap exists before the lens, a vertically asymmetric distortion which cannot be corrected even by use of an ordinary asperic lens is caused in a beam shape. FIG. 11 shows this distortion in the beam shape using lines with arrows representing optical paths. Specifically, FIG. 11 shows that an optical signal through an optical path passing a center of the lens travels in a horizontal direction, whereas optical signals through upper and lower optical paths passing peripheral portions of the lens travel upwardly from the horizontal direction. This results in a reduction in coupling efficiency between PLC-guided light and Gaussian beams propagating in atmosphere, which causes an excessive coupling loss.

As has been described above, the structure of the conventional technique, in which optical signals outputting from the facet of the PLC are optically coupled to a different bulk type optical device or the like, has a problem of being so complicated that an assembly process thereof is time consuming and alignment therefor is laborious. There has been demand of an optical circuit which allows an optical signal processing apparatus to be easily produced and assembled and which has a simpler structure. Moreover, the structure in which the output facet of the PLC is polished with an angle in order to prevent return light from occurring at the facet has a problem of an increase in coupling loss in free space optics.

The present invention has been made in view of such problems. An object of the present invention is to achieve an optical signal processing apparatus producible in a simpler assembly process by optically coupling optical signals outputting from a facet of a PLC to a different bulk type optical device or the like, by use of an optical circuit with a simpler structure. Moreover, another object of the present invention is to prevent reduction, due to the angled facet, in coupling efficiency between PLC-guided light and Gaussian beams propagating in atmosphere and to reduce coupling loss in free space optics.

Patent Document 1: Japanese Patent Laid-Open No. 2002-250828 (pages 16, 19, FIGS. 20, 27 29D, and the like).

DISCLOSURE OF THE INVENTION

The present invention made to achieve the above objects is an optical circuit configured to input and output an optical signal to and from a space, characterized by that the optical circuit comprises a planar lightwave circuit (PLC) including a substrate, a cladding layer formed on the substrate, and at least one optical waveguide core formed in the cladding layer, the optical circuit further comprises: an angled polished facet through which the at least one optical waveguide core inputs and outputs the optical signal to and from the space; a lens which is bonded onto the angled polished facet, and which collimates or focuses an optical signal from an aperture or to an aperture of the at least one optical waveguide core; and an adhesive layer which is filled between the angled polished facet and a bonded face of the lens.

Preferably, a thickness of the adhesive layer may be in a range from 10 to 100 μm In addition, preferably, the lens may be any one of a plano-convex lens and a cylindrical lens which have a flat surface on a side facing the angled polished facet. Furthermore, preferably, a refractive index of the adhesive layer is in a range from 1.3 to 1.6, both inclusive.

According to another aspect of the present invention, it is preferable that a reinforcement part is further included, which is arranged on top of a surface of the substrate of the PLC and near the aperture, and which forms an extended angled polished facet continuously extended from the angled facet, in which the extended angled polished facet and the lens are bonded to each other with the adhesive layer, and a width, in a thickness direction of the substrate, of the extended angled polished facet is smaller than a width of the bonded face of the lens, the bonded face facing the extended angled polished facet with an adhesive interposed therebetween. Thereby, a material of the adhesive layer can be prevented from flowing around the lens.

According to still another aspect of the present invention, an optical fiber may be further included, the optical fiber to be optically coupled to another optical waveguide core which has an aperture on an extension of the angled facet of the PLC. Thereby, limitation of arrangement interference of parts in the optical signal processing apparatus can be suppressed.

The present invention is also applicable to an optical signal processing apparatus including: the above-described optical circuit; and a free space optical device including at least an optical signal processing device having a plurality of elements, each of the elements performing signal processing on optical signals from the optical circuit, in which focal positions of the optical signals on the free space optical device are aligned with an arrangement position of the optical circuit.

Preferably, the free space optical device may include at least one lens arranged on an optical path between the optical circuit and the optical signal processing device. In addition, it is preferable that the PLC includes a slab waveguide and arrayed waveguides, and a facet of the arrayed waveguides forms the aperture.

BRIEF DESCRIPTION OF THE DRAWINGS

FIG. 2A is an enlarged view of and around an output facet of the optical circuit of the present invention to be optically coupled to free space optics;

FIG. 2B is a drawing schematically showing changes of refractive index of media near an angled facet with an air gap according to a conventional technique;

FIG. 2C is a drawing schematically showing changes of refractive index of media near an angled facet in a structure of the optical circuit of the present invention;

BEST MODE FOR CARRYING OUT THE INVENTION

Hereinafter, embodiments of the present invention will be described in details with reference to the drawings. In an optical circuit of the present invention, a lens is bonded to an angled facet of a PLC. Thereby, the optical circuit of the present invention is able to achieve optical coupling to a bulk type optical device or to another PLC with a simple structure.

First Embodiment

Figure 1A:
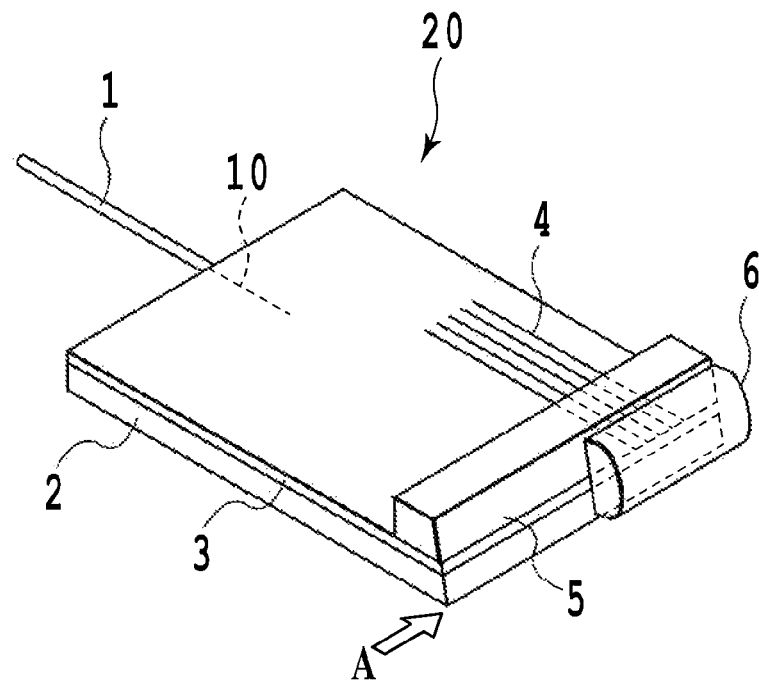
FIG. 1A is a structural drawing of an optical circuit of the present invention to be optically coupled to free space optics.
Figure 1B:
FIG. 1B is a sectional structural drawing of the optical circuit of the present invention to be optically coupled to free space optics.

FIG. 1A and FIG. 1B are structural drawings of an optical circuit of the present invention to be optically coupled to free space optics. FIG. 1A is a perspective view of the optical circuit. The optical circuit has a function to optically couple a PLC 20 with a bulk type optical device or another PLC in an optical signal processing apparatus. The PLC 20 is formed of an optical waveguide layer 3 formed on a substrate 2. In general, the optical waveguide layer 3 includes a cladding layer and an optical waveguide core layer which is formed thereinside and which has a refractive index slightly different from that of the cladding layer. In the optical waveguide layer 3, for example, arrayed waveguides are formed by optical waveguide cores in accordance with an optical signal processing function to be achieved.

An optical fiber 1 is connected to an input waveguide 10 of the PLC 20. No limitation is imposed on optical signal processing functions to be achieved by the PLC 20. If the PLC 20 has a function of a demultiplexer, for example, the PLC 20 includes an AWG, and has multiple output waveguides 4. Optical signals subjected to signal processing in the PLC 20 output from the output waveguides 4 at a facet A of the substrate toward the right in FIG. 1A, and are optically coupled to a bulk type optical device or another PLC.

A reinforcement part 5 is provided on a surface of the waveguide layer 3 of the PLC 20 and near an optical signal output facet A. The output facet and the reinforcement part 5 form a single continuous angled facet. A cylindrical lens 6 is bonded onto and in close contact with the angled facet so as to cover core apertures of the output waveguides 10.

FIG. 1B is a side view of the optical circuit viewed from a side face of the substrate. The angled surface of the reinforcement part 5 and the facet of the PLC 20 are in the same plane. The cylindrical lens is slightly inclined toward the PLC with respect to a perpendicular plane to the substrate surface. An inclination angle is, for example, 8° from the perpendicular plane. The output facet is polished with an angle, which provides an effect of reducing an influence of light (return light) reflected at the facet.

The reinforcement part 5 is made of glass, and bonded and fixed to a surface of the waveguide layer 3 with an adhesive. The adhesive is one whose refractive index is matched with that of quartz of the substrate, and is, for example, a UV curable adhesive.

FIG. 2A is an enlarged view of and around the output facet of the PLC in the optical circuit of the present invention to be optically coupled to free space optics. As can be seen from FIG. 2A, facets are polished so as to form one angled surface extending from the substrate 2, through the waveguide layer 3, to the reinforcement part 5. An adhesive layer 7 exists between the cylindrical lens 6 and the polished surface.

FIG. 2B schematically shows changes of refractive index of media including an optical path near an angled facet with air gap according to a conventional technique. In a structure of the conventional technique, an optical signal propagates through an optical path in which air having a refractive index of 1 is interposed between a waveguide layer 3 and a lens 6 having substantially the same refractive indexes n to each other. Meanwhile, in a structure of the optical circuit of the present invention shown in FIG. 2C, the adhesive layer 7 having a refractive index n substantially identical to that of the optical waveguide and that of the lens is interposed between the optical waveguide and the lens. Thereby, an optical signal propagates through an optical path an entire of which is filled with media having almost no difference in refractive index therebetween, until converted into collimated beams.

Figure 3:
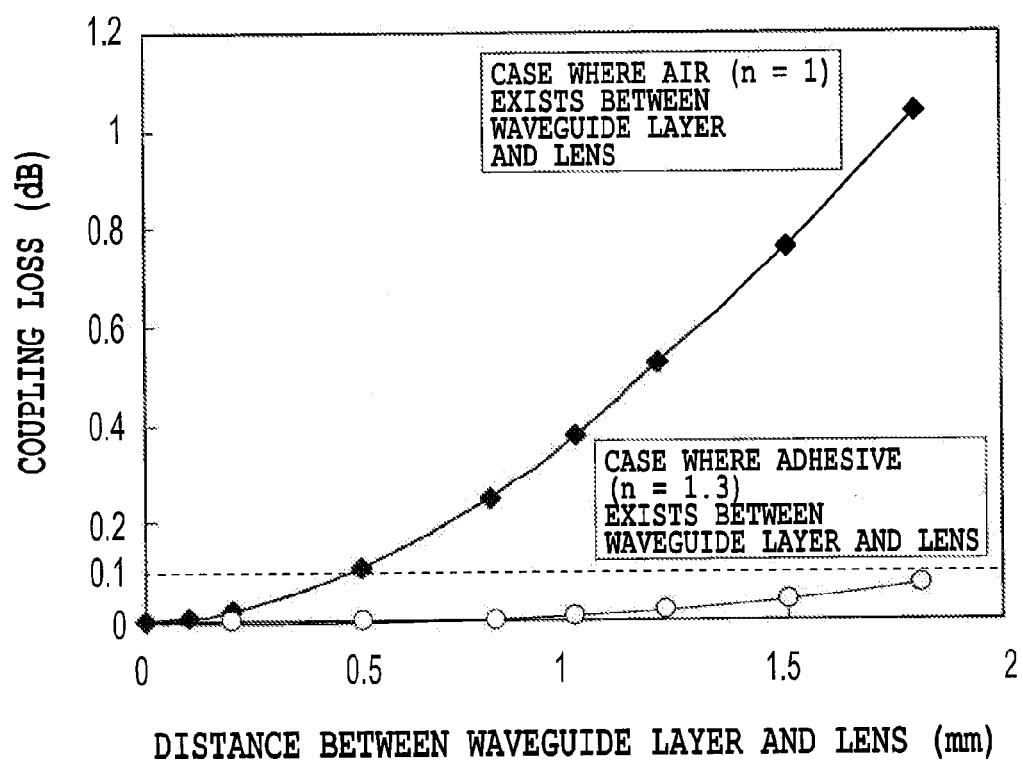
FIG. 3 shows a relationship of a distance between a PLC and a lens with coupling loss.

FIG. 3 is a graph showing a relationship of a distance between the waveguide layer and the lens with coupling loss. A case where air (n=1) exists between the waveguide layer and the lens, and a case where the adhesive (n=1.3) exists between the waveguide layer and the lens are shown. When an adhesive between the waveguide layer and the lens has a refractive index (n=1.45) identical to that of quartz, the coupling loss is 0 dB. Here, a case of the conventional technique where a gap of 1.8 mm exists between the lens and the angled facet of the PLC is compared with a case where the lens is bonded onto the angled facet with the adhesive layer 7, in terms of coupling efficiency between the PLC-guided light and Gaussian beams propagating in atmosphere. This comparison shows that the optical circuit of the present invention makes it possible to reduce excess loss by 1 dB or more. Note that calculation is made on the assumption that the lens is an asperic cylindrical lens (f=2.43 mm).

As can be seen from FIG. 3, even when the refractive index between the waveguide layer and the lens is 1.3, the coupling loss can be suppressed to 0.1 dB or less, as long as the distance between the waveguide layer and the lens is 1.8 mm or less. Experience shows that such coupling loss of 0.1 dB or less will not cause any problem. The coupling loss is determined for the most part by the difference in refractive index between the waveguide layer and the adhesive. If the refractive index of the adhesive 7 is roughly in a range from 1.3 to 1.6, the excess loss can be reduced to 0.1 dB or less, which is a generally required measurement accuracy. As described above, since the output facet through which an optical signal outputs from the PLC is made into an angled surface, the influence of return light reflected at the facet can be reduced. In addition, since the lens is bonded to the angled facet of the PLC, it is possible to suppress an increase in excess loss due to decrease in coupling efficiency between PLC-guided light and Gaussian beams propagating in atmosphere. Moreover, since the refractive index between the PLC and the lens can be made larger than that of air, a permissible error of a focal point position can be made larger. In other words, it is possible to increase positional tolerance of a bulk type optical device to be optically coupled outside the PLC.

This embodiment employs a cylindrical lens which has a function of focusing light in a direction perpendicular to the substrate of the PLC as an example of the lens bonded to the angled facet of the PLC. However, a plano-convex lens whose one surface is flat also can be employed instead of the cylindrical lens, and the flat surface can be bonded to the angled facet of the PLC with the adhesive layer interposed therebetween.

Next, from the viewpoints of reliability and polarization dependent loss (PDL), discussion is made on a range of optimal value of a thickness of the adhesive layer in the optical circuit of the present invention.

Figure 4:
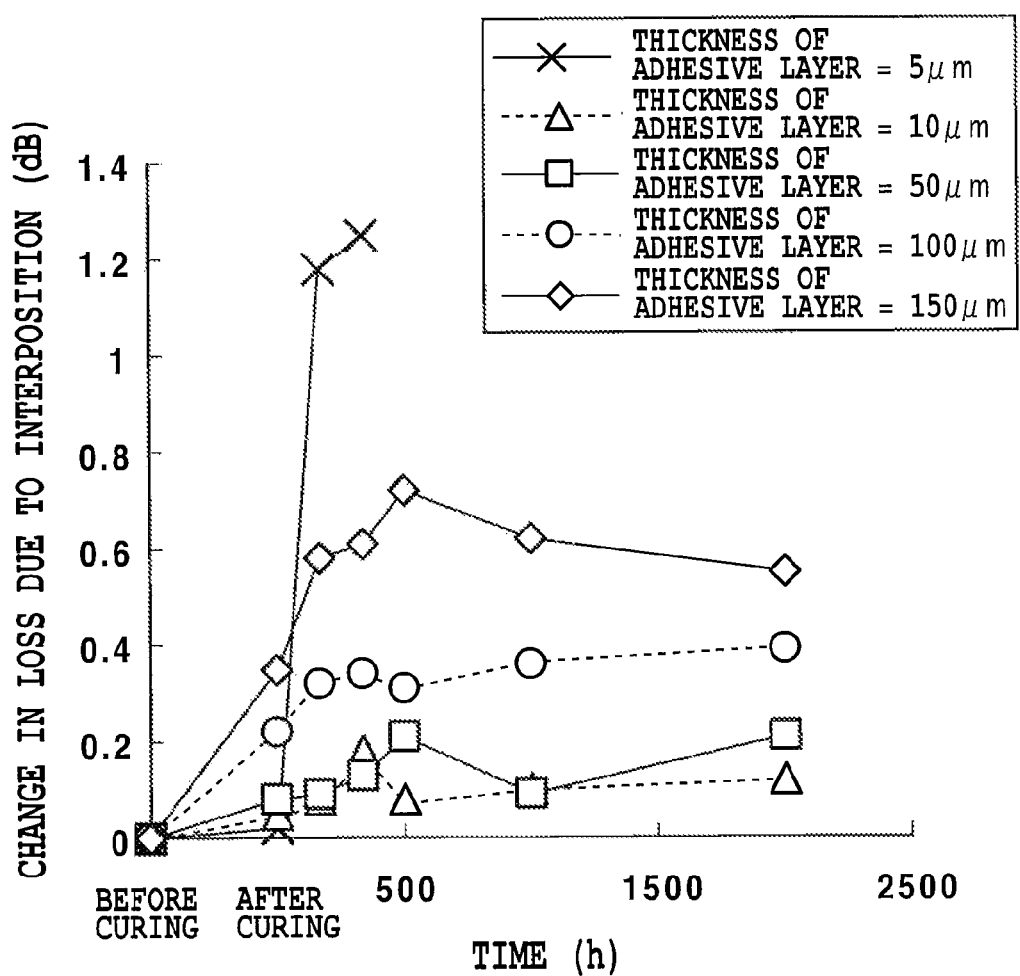
FIG. 4 is a graph showing an amount of change with time in insertion loss, with the adhesive layer thickness taken as a parameter.

FIG. 4 is a graph showing an amount of change with time in the loss due to the interposition of the adhesive layer (hereinafter referred to as insertion loss), with the thickness of the adhesive layers being taken as a parameter. In a horizontal axis, "after curing of the adhesive" and elapsed time (h) of a high-temperature and high-humidity test (at 85° C., 85% Rh) are shown. Meanwhile, a vertical axis represents an increased amount (dB) of the insertion loss, relative to values of insertion loss of test PLCs before the bonding and curing. The thickness of the adhesive layers is taken as a parameter, and varied in a range from 5 to 150 μm. A layout of each of the test PLCs is as follows: the waveguide is linear; an optical fiber is connected on a light input side; a cylindrical lens is bonded and fixed on a light output side. Facets, to which an optical fiber and a cylindrical lens are coupled respectively, of each of the PLCs are polished with an angle of 8°. Each PLC has a dimension of 15×15 mm. Each substrate thickness is 1 mm. Each waveguide core size is 6×6 μm. The cylindrical lens is made of a material of BK7, and has a size of 12×2×28 (mm).

As can be seen from FIG. 4, when the thickness of the adhesive layer is 5 μm, the insertion loss is increased by 1 dB or more, after 168 hours has passed in the high-temperature and high-humidity test. This is due to peeling of the adhesive layer which is caused because the adhesive layer is so thin that thermal distortion between the optical waveguide and the lens cannot be cushioned. Meanwhile, when the thickness of the adhesive layer is 150 μm, there is a largest increase in loss after the curing of the adhesive, and the amount of change in loss increases with time in the high-temperature and high-humidity test. This is presumably caused because, as the thickness of the adhesive layer becomes larger, a shrinkage amount at the time of the curing becomes larger and an amount of distortion of the adhesive in the high-temperature and high-humidity test is large. According to FIG. 4, as long as the thickness of the adhesive layer is 100 μm or less, a range of the change in the insertion loss is within 0.5 dB, within which no problem will occur on the basis of empirical knowledge. Accordingly, from the viewpoints of heat-resistance and moisture-resistance characteristics and permissible range of the change in the loss, the thickness of the adhesive layer is preferably in a range from 10 to 100 μm.

Figure 5:
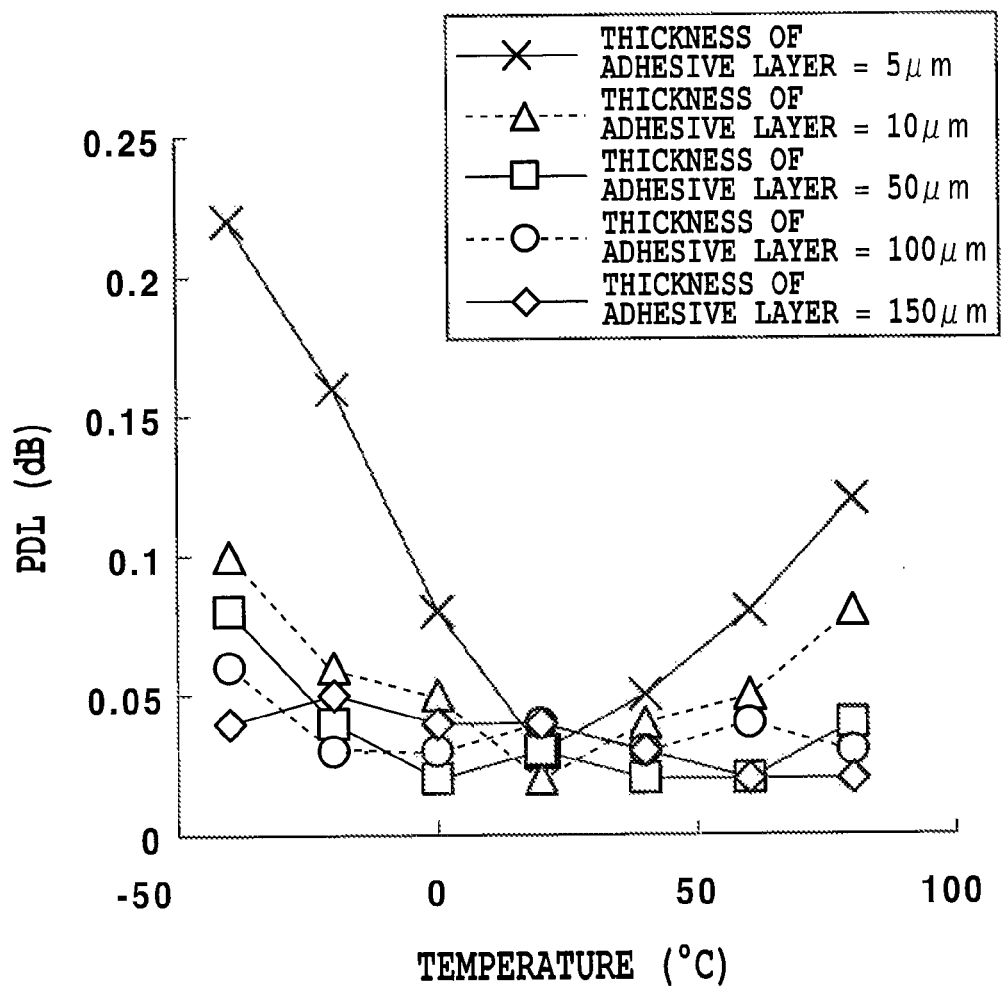
FIG. 5 is a graph showing temperature characteristics of polarization dependent loss, with the adhesive layer thickness taken as a parameter.

FIG. 5 is a graph showing an amount of change with temperature of polarization dependent loss, with the thickness of the adhesive layer taken as a parameter. A horizontal axis represents temperature (° C.), and a vertical axis represents polarization dependent loss (PDL) of test PLCs. The thickness of the adhesive layer is taken as a parameter, and is varied in a range from 5 to 150 μm. Each test PLC has a size of 15×15 (mm). Each substrate thickness is 1 mm. Each waveguide core size is 6×6 μm. Each spot size of output light is 4 μm at a wavelength of 1550 nm. A layout of the PLCs is the same as that in a case of FIG. 4.

As can be seen from FIG. 5, when the thickness of the adhesive layer is 5 μm, change with temperature in the PDL is significant. This is presumably because stress due to difference in coefficient for thermal expansion between the optical waveguide and the lens leads to an increase in birefringence of the lens. Meanwhile, if the thickness of the adhesive layer is 10 μm or more, an effect is obtained which reduces stress due to difference in coefficient for thermal expansion between the optical waveguide and the lens, and hence the PDL is within 0.1 dB, within which no problem will occur on the basis of empirical knowledge. As described above, the thickness of the adhesive layer in the optical circuit of the present invention is most preferably in a range from 10 to 100 μm.

Next, another embodiment will be described made by focusing on a relationship between a bonded face of a cylindrical lens and a bonded face of a PLC.

Second Embodiment

Figure 6:
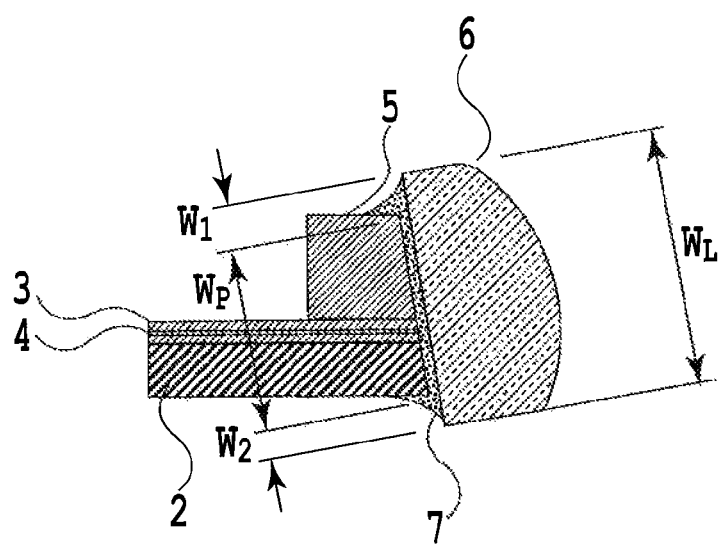
FIG. 6 is a sectional structural drawing of another embodiment of the optical circuit of the present invention.

FIG. 6 is a structural drawing of an optical circuit according to another embodiment of the present invention to be optically coupled to free space optics. Also in this embodiment, a structure in which an angled facet formed by a PLC substrate 2 including a waveguide layer 3 and by a reinforcement part 5 is bonded to a cylindrical lens 6, as substantially similar to that in the side view of the embodiment shown in FIG. 1B. This embodiment is characterized in a width of the bonded face in a thickness direction of the substrate. Specifically, a width $W_P$ of the bonded face on the PLC side is smaller than a width $W_L$ of the bonded face on the cylindrical lens side. With such a structure, an adhesive applied between the two bonded faces is prevented from flowing around a convex portion of the cylindrical lens through which light passes. Such flowing of the adhesive around a convex side of the cylindrical lens causes unexpected scattering or refraction, whereby desired optical characteristics can not be obtained.

With reference to FIG. 6, a condition of a width of the bonded face in a direction perpendicular to the substrate 2 (a thickness direction of the substrate) has been shown. Similarly for a length of the cylindrical lens 6 in a long side direction, a length of the bonded face of the cylindrical lens is preferably longer than a length of the bonded face on the PLC side. However, a length of a long side of the cylindrical lens is sufficiently longer than that of a region over which optical waveguide cores are formed. Accordingly, the flowing-around of the adhesive is less influential than that in the thickness direction of the substrate. Therefore, the length of the cylindrical lens 6 in a long side direction is not necessarily made longer than the side of the substrate 2.

Hereinafter, an example of a specific structure will be shown. A thickness of a PLC substrate is set to 1 mm. A thickness of a reinforcement part is set to 1.5 mm. When an inclination angle of a facet is set to 8°, a width $W_P$ of the facet on a substrate side is approximately 2.5 mm. A width of the cylindrical lens at this time can be set to 4 mm (typically, a length of a long side of the cylindrical lens is 12 mm, and a height of a convex is 3.5 mm). As shown in FIG. 6, a width $W_L$ of the cylindrical lens is represented by the following formula:

$$W_L = W_P + W_1 + W_2 \quad \text{Formula (1)}$$

where $W_1$ represents a length of a portion of the cylindrical lens extending above the bonded face, and $W_2$ represents a distance of a portion of the cylindrical lens extending below the bonded face. According to experimental results, in a case where an adhesive for optical use such as an ordinary epoxy-based adhesive is used, both $W_1$ and $W_2$ are preferably set to 300 μm or more. However, the values of $W_1$ and $W_2$ are determined depending on viscosity of the adhesive and wettability of the objects to be bonded. Hence, for some kinds of adhesives, when both $W_1$ and $W_2$ are 100 μm or more, an result to be obtained can be similar to that obtained in a case of the above-described adhesive for optical use such as an ordinary epoxy-based adhesive.

Figure 7:
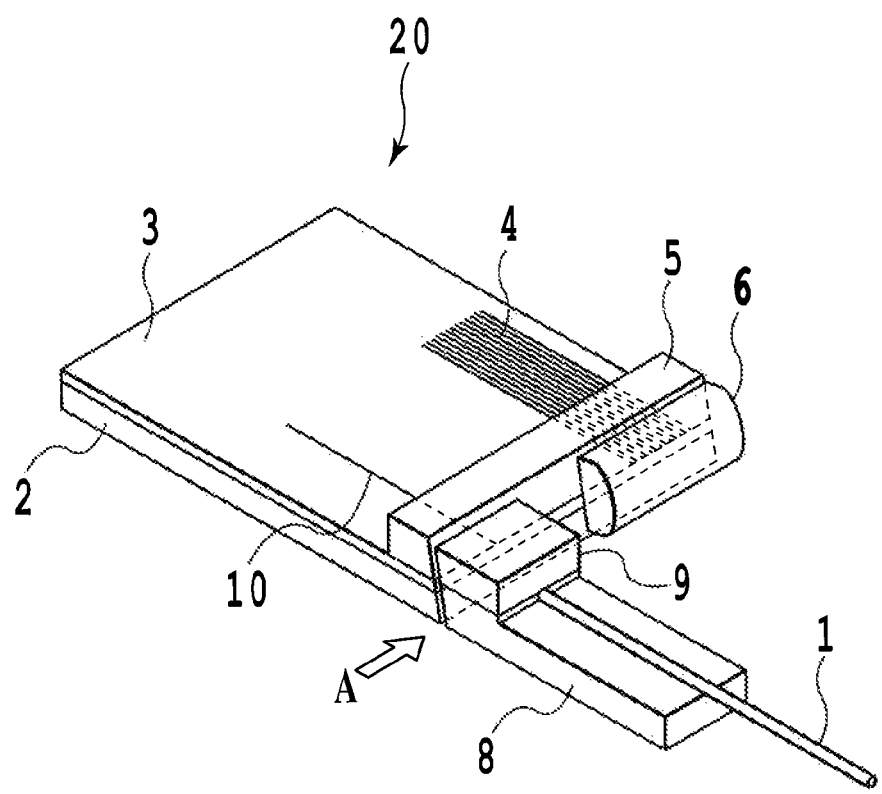
FIG. 7 is a structural drawing of an optical circuit of another embodiment of the present invention.

FIG. 7 is a structural drawing of an optical circuit according to still another embodiment of the present invention to be optically coupled to free space optics. This embodiment is characterized in that an optical circuit having the structure as shown in FIG. 1 is coupled to free space optics and connected to an optical fiber through a single facet of a PLC. As shown in FIG. 7, a reinforcement part 5 is provided on one facet of a PLC 20, and a single angled facet (point A) is formed from a substrate 2, through a waveguide layer 3, to the reinforcement part 5. A cylindrical lens 6 is bonded so as to cover core apertures of output waveguides 4 on the facet. Meanwhile, on the same angled facet, an optical fiber 1 held by a V-grooved substrate 8 is connected to an input waveguide 10 which has a core aperture at a different position in the waveguide layer 3. The optical fiber 1 is bonded to the angled facet together with a fiber holder 9 and the V-grooved substrate 8.

The optical circuit of this embodiment is fabricated by the following procedure. First, the reinforcement part is bonded and fixed to a surface of the optical waveguide layer near the facet through which optical signals are outputted and inputted. Next, the facet to which the optical fiber and the lens are bonded is polished. Further, the optical fiber and of the facet of the PLC are aligned. Then, the PLC and the V-grooved substrate are bonded to each other with an UV curable adhesive. Moreover, the lens and the optical waveguides are aligned, and the facet of the PLC and the lens are bonded to each other with an UV curable adhesive.

According to this embodiment, a lens and an optical fiber are respectively bonded to different core apertures exposed on a single angled facet. Accordingly, optical signals can be inputted to and outputted from a PLC through the single facet. For this reason, the optical circuit of this embodiment is able to achieve compact integration with another PLC or a bulk type optical device in an optical signal processing apparatus. This structure allows an assembly process to be much more simplified than a structure of a conventional technique in which an optical signal flows in one direction and an optical signal is inputted and outputted through two facets. This embodiment is economical because only one facet of a PLC needs to be subjected to polishing processing. Moreover, it is possible to prevent leak light which is caused by a slight misalignment of an optical fiber and a PLC from coupling to a lens otherwise located on another facet. Next, an embodiment will be described in which an optical circuit of the present invention is applied to an optical signal processing apparatus.

Third Embodiment

Figure 8A:
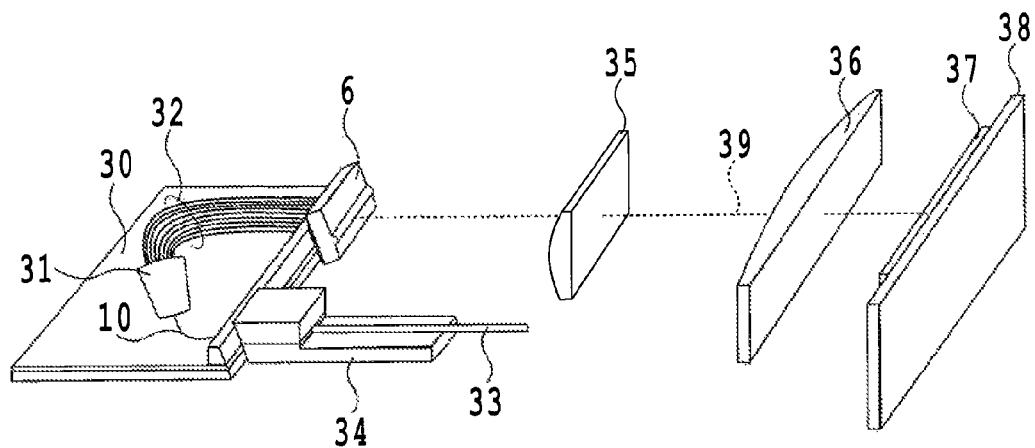
FIG. 8A is a perspective view showing a structure of an optical signal processing apparatus including an optical circuit of the present invention.
Figure 8B:
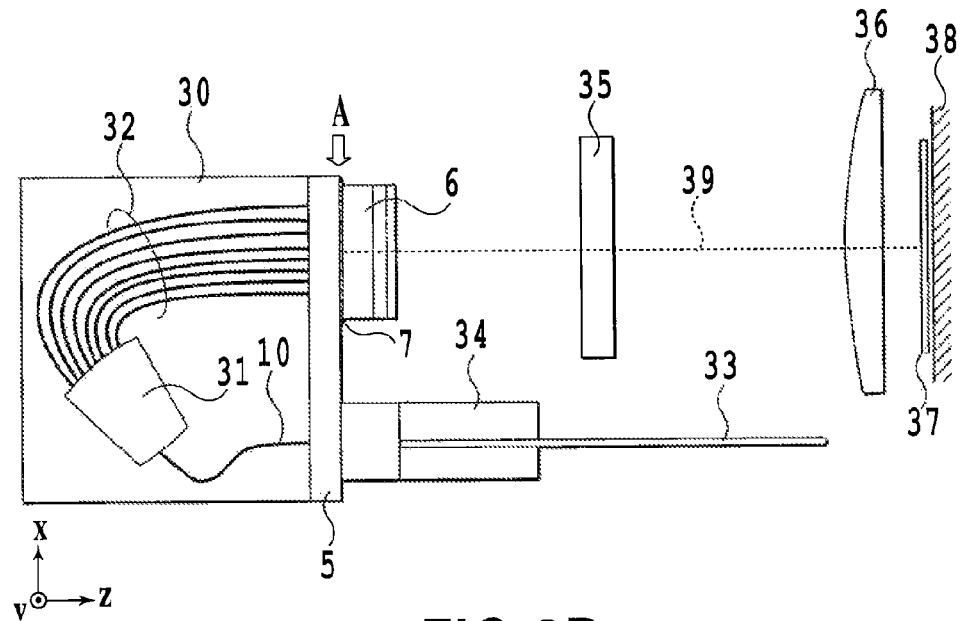
FIG. 8B is a top view showing the structure of the optical signal processing apparatus including the optical circuit of the present invention.
Figure 8C:
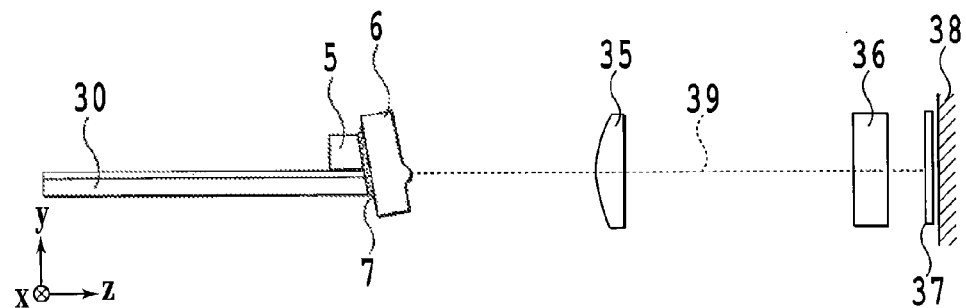
FIG. 8C is a sectional view showing the structure of the optical signal processing apparatus including the optical circuit of the present invention.

FIGS. 8A, 8B, and 8C are views showing a structure of an optical signal processing apparatus including an optical circuit of the present invention. FIG. 8A shows a perspective view of this apparatus, and FIG. 8B and FIG. 8C respectively show a top view of this apparatus and a view of a section thereof including an optical axis. The optical signal processing apparatus can achieve various signal processing functions depending on a structure, a function, and the like of a signal processing device. Here, description will be made while a wavelength blocker is taken as an example.

Refer to FIG. 8A. The optical signal processing apparatus is formed of a PLC substrate 30 including an AWG, and bulk type optical devices. The bulk type optical devices are arranged on an optical path shown by a dotted line 39, and include a first focusing lens 35, a second focusing lens 36, a signal processing device 37, and a mirror 38. The AWG is formed on the PLC substrate 30, and includes an input and output waveguide 10, a slab waveguide 31, arrayed waveguides 32, and the like. The AWG is ordinarily formed on a substrate of silicon, quartz, or the like. A waveguide end, which is to be connected to an optical fiber 33 and which is continuous from the waveguide 10, and multiple waveguide ends which are continuous from the arrayed waveguides 32 are formed on an edge of the PLC substrate 30.

The optical fiber 33 is connected to the waveguide 10 by use of an optical fiber part 34. The optical fiber part 34 is fabricated by allowing the optical fiber 33 to be mounted on a V-grooved substrate of glass, holding the optical fiber 33 by a glass plate, and bonding and fixing the optical fiber 33. The optical fiber 33 is terminated with an optical connector, which is not shown. A cylindrical lens 6 bonded onto an angled facet in accordance with the present invention is fixed to the above-described multiple waveguide ends. As can be seen from the sectional view in FIG. 8C, the cylindrical lens 6 is a cylindrical lens only a part of which including the optical axis 39 is formed into a convex. It should be noted that the cylindrical lens does not necessarily have a shape in which an entirety forms a convex surface as shown in FIG. 1, FIG. 6, or FIG. 7.

With reference to FIG. 8B, outline of operation of this optical signal processing apparatus will be described, while a wavelength blocker is taken as an example. This signal processing apparatus includes the mirror 38 at an end of the optical path, and hence has a reflective structure in which multiple optical signals with different wavelengths are combined and split in the one AWG. Accordingly, both of the two kinds of waveguide ends on the facet A of the substrate 30 function as an input terminal and an output terminal. A set of optical signals inputted from the optical fiber 33 are split in the AWG, and output from the facet A of the PLC substrate 30 in a z axis direction at output angles depending on their wavelengths. Output light is collimated by the cylindrical lens 6 with respect to a direction perpendicular to the substrate 30 (a y-axis direction). The collimated optical signals are further concentrated by the two focusing lenses 35 and 36 and concentrated at positions on the signal processing device 37 along x-axis depending on their wavelengths. The optical signals undergo signal processing such as intensity modulation by the signal processing device 37, then are reflected by the mirror 38, and propagate through an output path (the optical axis 39), which is the same as the input path, back toward the AWG. While propagating through a path which is reverse to the input path, the optical signals are combined back by the AWG, and outputted to the optical fiber 33.

The optical signal processing device 37 performs the intensity modulation on signals each having a different wavelength, whereby this optical signal processing apparatus can be operated as a wavelength blocker. The signal processing device 37 is used as, for example, a liquid crystal device or a steering device, and controls a transmittance of each element (pixel) so that multiple pixels perform signal processing at their respective wavelengths. Here, the structure including the two focusing lenses 35 and 36 is shown as an example. However, the structure is not limited thereto, and may include one focusing lens. In addition, the cylindrical lens 6 and the focusing lenses 35 and 36 are fabricated by glass molding, and each lens portion thereof is asperic to suppress aberration.

This optical signal processing apparatus is fabricated by the following procedure. First, the reinforcement part 5 is bonded to the two types of the waveguide ends located on the facet A of the PLC substrate 30. Then, the facet on which the cores are exposed is polished at an angle of 8°. Next, the optical fiber part 34 and the cylindrical lens 6 are aligned respectively to the facet on the side of the waveguide 10 and the facet on the side of the arrayed waveguides 32, and bonded and fixed thereto. The distance between the facet and the cylindrical lens 6, i.e., the thickness of the adhesive layer is set to 20 μm so that the output light can be collimated beams. Next, the focusing lenses 35 and 36 and a signal processing device 37 provided with a mirror are positioned on a base plate, and fixed thereto. On this base plate, the PLC substrate 30 to which the optical fiber part and the cylindrical lens are bonded is further arranged in alignment, and fixed thereto.

As shown in FIG. 8C, as for a bonded face on the facet of the PLC substrate and the bonded face of the cylindrical lens 6, which face each other, a width, in a y direction, of the bonded face on the side of the cylindrical lens is made larger than a width on the side of the facet of the substrate. Thereby, the applied adhesive is prevented from flowing around the optical path of the cylindrical lens 6. Here, the thickness of the substrate of the PLC is 1 mm. The thickness of an auxiliary member is 1.5 mm. A width of the cylindrical lens in a y direction is 4 mm.

The AWG combines and splits optical signals by utilizing difference in optical path length of the arrayed waveguides. For this reason, if the AWG is fixed by use of an optical alignment part such as a stainless steel plate used in conventional techniques, a stress at the time of the fixation causes slight change in optical path length of the AWG. This may lead to a case where a desired optical characteristic cannot be obtained. In the optical signal processing apparatus of this embodiment, the cylindrical lens is directly bonded and fixed to the AWG, so that no stress is applied to the arrayed waveguides.

When the optical circuit is to be optically coupled to a bulk type optical device, another PLC, or the like, the direction of output light from the lens needs to be changed vertically and horizontally for alignment in some cases. In the optical circuit of the present invention, the cylindrical lens and the optical fiber part are arranged so as to be close to each other, with a short distance therebetween. Accordingly, even when the optical circuit of this embodiment is rotated, with the cylindrical lens taken as a center point, in a plane of the optical circuit or a plane perpendicular to the plane of the circuit in order to change the direction of output light from the lens, since a turning radius of the optical circuit is small, the position of the optical fiber part is not changed so significantly.

Accordingly, arrangement interference with a bulk type optical device, another PLC, or the like located near the optical fiber part can be suppressed. Since the direction of output light can be changed with the cylindrical lens taken as the center point, the optical signal processing apparatus can be easily assembled and aligned. In particular, as an area of the PLC to which the lens is bonded is greater, this effect becomes significant. Moreover, as shown in FIG. 7, when both the coupling to the free space optics and the connection to the optical fiber are performed on a single facet of the PLC, the cylindrical lens and the optical fiber part can be arranged within a short distance. This arrangement is highly effective in suppressing the arrangement interference in the above-descried optical signal processing apparatus. Next, this effect of suppressing arrangement interference will be described specifically.

Figure 9A:
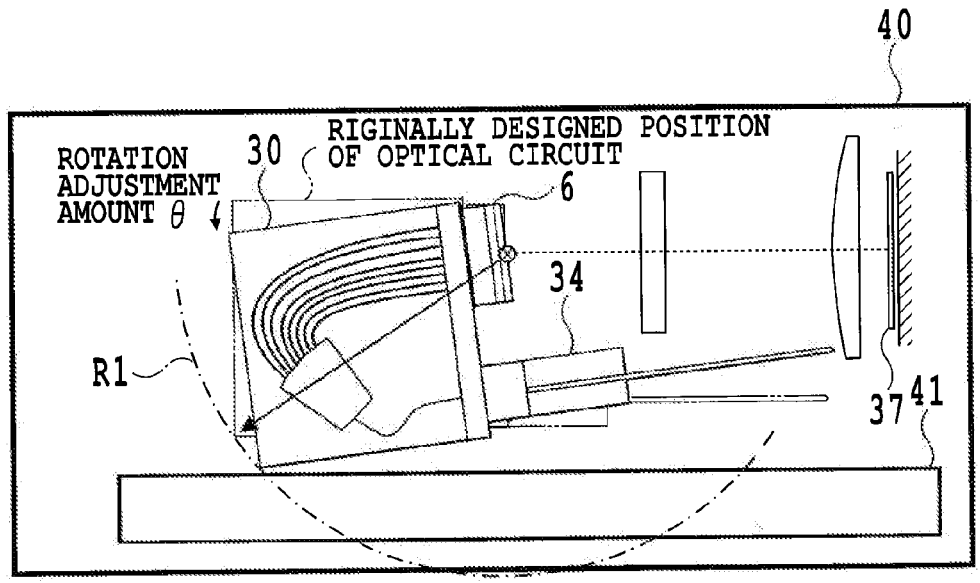
FIG. 9A is a drawing for describing an effect of suppressing arrangement interference in an optical signal processing apparatus which includes an optical circuit of the present invention and an optical fiber provided to a single facet.
Figure 9B:
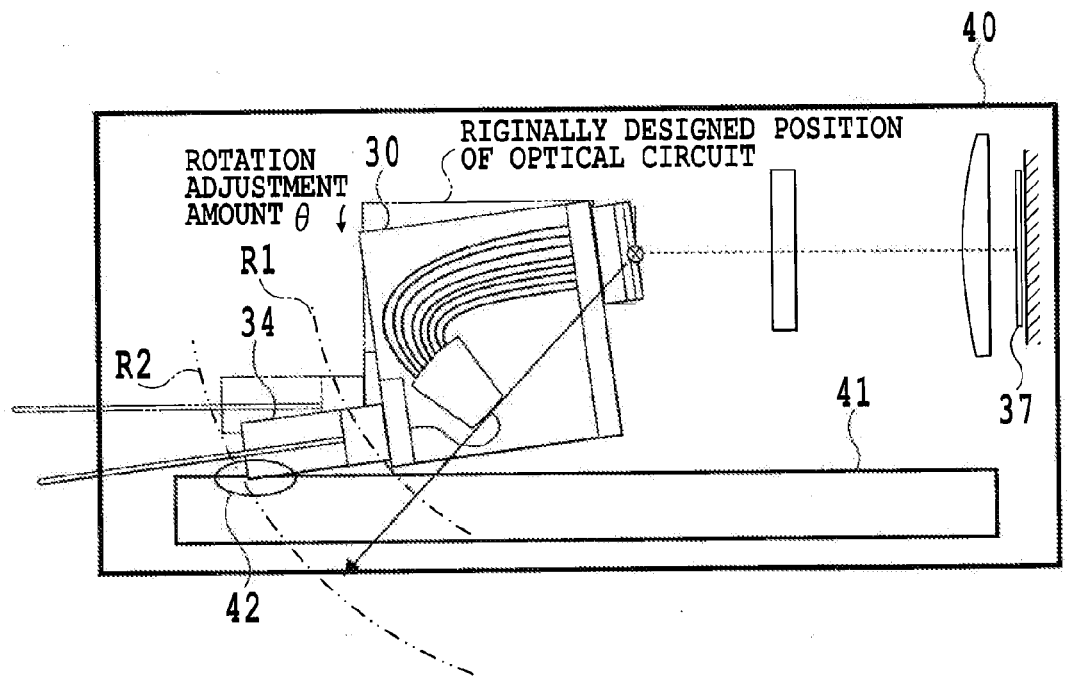
FIG. 9B is a drawing for describing arrangement interference in an optical signal processing apparatus which includes an optical circuit of the present invention and an optical fiber provided to different facets for comparison.
Figure 10:
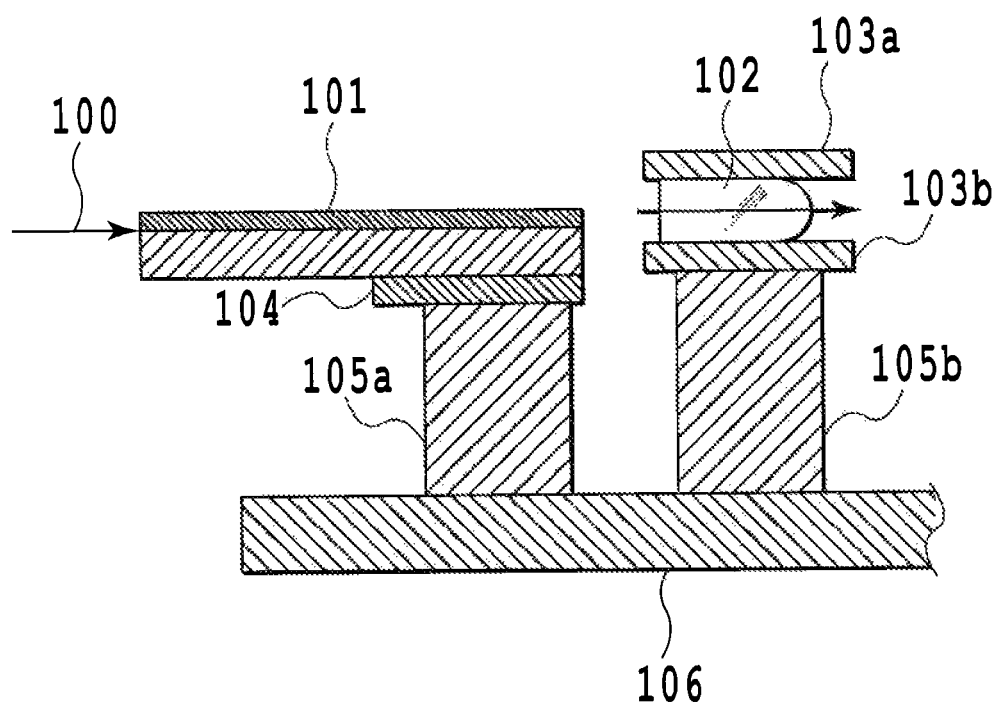
FIG. 10 is a view showing a part of a structure of an optical signal processing apparatus using a PLC.
Figure 11:
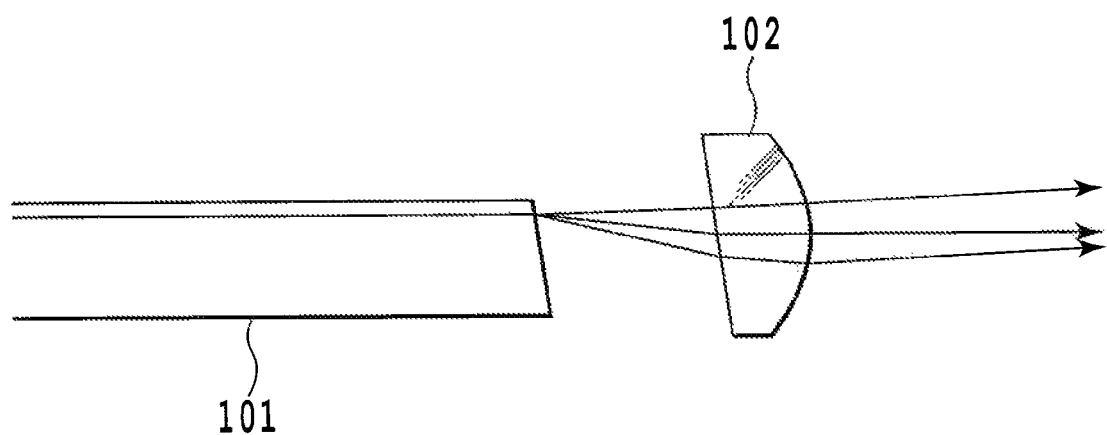
FIG. 11 is a diagram showing behavior of output beams at and near a facet of a PLC of the conventional technique.

FIG. 9A and FIG. 9B are drawings for describing the effect of suppressing arrangement interference of parts in the optical signal processing apparatus achieved by the optical circuit of the present invention. FIG. 9A shows arrangement interference in the optical signal processing apparatus in a case where the cylindrical lens and the optical fiber part are fixed to a single facet in the optical circuit of the present invention. Meanwhile, for comparison, FIG. 9B shows arrangement interference in an apparatus in which the cylindrical lens and the optical fiber part are fixed to different facets in the optical circuit of the present invention. The optical signal processing apparatus of the embodiment shown in FIG. 8 is arranged on the base plate 40, and moreover the control board 41 including a circuit for controlling the optical signal processing apparatus and the like is arranged thereon. An originally designed position of the optical circuit including the PLC substrate is shown by a dotted line.

Refer to FIG. 9A. The cylindrical lens 6 and the optical fiber part 34 are fixed to the single facet of the PLC substrate 30. For this structure, an adjustment needs to be performed at a rotation adjustment amount of $\theta$ with a central output point of the cylindrical lens 6 taken as a rotation center, in order to align positions of the elements arranged on the signal processing device 37 with focal points of optical signals for the AWG. At this time, if the optical fiber part 34 is located inside a circle with a radius of R1 circumscribing the substrate 30, an allowable amount of rotation angle within which the PLC substrate 30 can be rotated for adjustment without interference with the control board 41 is limited only by the size of the PLC substrate 30 including the AWG.

Meanwhile, as shown in FIG. 9B, when the optical fiber part 34 is arranged on a facet, of the PLC substrate 30, opposite to the cylindrical lens 6, arrangement of components in the optical signal processing apparatus are further limited. In this case, a circle with a radius of R2 circumscribing parts including the optical fiber part 34 is larger than the circle with the radius of R1 circumscribing the PLC substrate 30 including the AWG. For this reason, when the PLC substrate 30 is attempted to be rotated for adjustment by the same rotation angle $\theta$ as in FIG. 9A, the optical fiber part 34 and a part 42 of the control board 41 in an arrangement example in FIG. 9B may interfere with each other in some case. To avoid this arrangement interference, it is necessary to limit the allowable rotation angle $\theta$ or to make the base plate 40 forming the apparatus larger.

Such arrangement interference causes no problem for optical devices for which an optical fiber is simply connected to a PLC substrate including an AWG or the like. However, such arrangement interference causes a problem peculiar to optical signal processing apparatuses for which an adjustment for alignment with a bulk type optical device, other than a PLC substrate, such as a signal processing device is necessary. For this reason, applying the optical circuit of the present invention shown in FIG. 7 in which the cylindrical lens and the optical fiber part are arranged on the single facet of the PLC substrate to an optical signal processing apparatus provides an excellent effect that arrangement interference of parts can be suppressed in the optical signal processing apparatus.

Note that the reinforcement part 5 shown in FIG. 7 is an integrated one to which both the lens and the optical fiber are fixed. However, the reinforcement part 5 may be discrete and different reinforcement parts. Moreover, the method of fixing the optical fiber is not limited to a method in which the V-grooved substrate is used; alternatively, a method in which a cylindrical part such as a ferrule may be employed.

As have been described in details, an optical circuit of the present invention and an optical signal processing apparatus using the same make it possible to optically couple an optical signal which outputs from a facet of a substrate of a PLC to a bulk type optical device, another PLC, or the like by use of a further simple structure of an optical circuit. Moreover, an assembly process can be simplified to a great extent. Furthermore, drop of coupling efficiency of guided light in a PLC with Gaussian beams propagating in atmosphere due to an angled facet can be prevented, and coupling loss in free space optics can be reduced. Note that in description of the above-described embodiments, PLCs of quartz are taken as examples. The present invention is also applicable to PLCs of a polymer.

INDUSTRIAL APPLICABILITY

The present invention is applicable to optical signal processing apparatuses used for optical communications. The present invention is applicable to, for example, wavelength blockers in the beginning, wavelength equalizers, dispersion compensators, and the like.

The invention claimed is:

1. An optical circuit configured to input and output an optical signal to and from a space, the optical circuit comprising a planar lightwave circuit (PLC) comprising a substrate, a cladding layer formed on the substrate, and at least one optical waveguide core formed in the cladding layer, the optical circuit further comprising:
   an angled polished facet through which the at least one optical waveguide core inputs and outputs the optical signal to and from the space;
   a reinforcement part positioned above a surface of the substrate of the PLC and near the aperture, the reinforcement part having a facet aligned with and extending from the angled polished facet so that the facet of the reinforcement part and the angled polished facet form an extended angled facet,
a lens which is bonded onto the extended angled facet, and which collimates or condenses an optical signal from an aperture or to an aperture of the at least one optical waveguide core; and
an adhesive layer positioned between the extended angled facet and a bonded face of the lens; and
wherein
the lens is one of a plano-convex lens and a cylindrical lens which has a flat surface on a side facing the extended angled polished facet, the flat surface forming the bonded face of the lens,
the extended angled facet and the bonded face of the lens are bonded together with an adhesive interposed therebetween in the adhesive layer,
a width, in a thickness direction of the substrate, of the extended angled facet is less than a width of the flat surface of the lens, and
the lens extends beyond the extended angled facet in both upward and downward directions.

2. The optical circuit according to claim 1, wherein a thickness of the adhesive layer is in a range from 10 to 100 μm.

3. An optical signal processing apparatus comprising:
the optical circuit according to claim 2 which is further comprising an optical fiber to be optically coupled to another optical waveguide core which has an aperture on an extension of the angled facet of the PLC; and
a free space optical device including at least an optical signal processing device having a plurality of elements, each of the elements performing signal processing on optical signals from the optical circuit, wherein
focal positions of the optical signals on the free space optical device are aligned with an arrangement position of the optical circuit,
the free space optical device includes at least one focusing lens arranged on an optical path between the optical circuit and the optical signal processing device,
the PLC includes a slab waveguide and arrayed waveguides, and
a facet of the arrayed waveguides forms the aperture.

4. The optical circuit according to claim 1, wherein a refractive index of the adhesive layer is in a range from 1.3 to 1.6, both inclusive.

5. An optical signal processing apparatus comprising:
the optical circuit according to claim 4 which is further comprising an optical fiber to be optically coupled to another optical waveguide core which has an aperture on an extension of the angled facet of the PLC; and
a free space optical device including at least an optical signal processing device having a plurality of elements, each of the elements performing signal processing on optical signals from the optical circuit, wherein
focal positions of the optical signals on the free space optical device are aligned with an arrangement position of the optical circuit,
the free space optical device includes at least one focusing lens arranged on an optical path between the optical circuit and the optical signal processing device,
the PLC includes a slab waveguide and arrayed waveguides, and
a facet of the arrayed waveguides forms the aperture.

6. The optical circuit according to claim 1, further comprising an optical fiber optically coupled to another optical waveguide core, the other optical waveguide core having an aperture on an extension of the angled facet of the PLC.

7. An optical signal processing apparatus comprising:
the optical circuit according to claim 6; and
a free space optical device including at least an optical signal processing device having a plurality of elements, each of the elements performing signal processing on optical signals from the optical circuit, wherein
focal positions of the optical signals on the free space optical device are aligned with an arrangement position of the optical circuit,
the free space optical device includes at least one focusing lens arranged on an optical path between the optical circuit and the optical signal processing device,
the PLC includes a slab waveguide and arrayed waveguides, and
a facet of the arrayed waveguides forms the aperture.

8. An optical signal processing apparatus comprising:
the optical circuit according to claim 1; and
a free space optical device including at least an optical signal processing device having a plurality of elements, each of the elements performing signal processing on optical signals from the optical circuit, wherein focal positions of the optical signals on the free space optical device are aligned with an arrangement position of the optical circuit.

9. The optical signal processing apparatus according to claim 8, wherein the free space optical device includes at least one focusing lens arranged on an optical path between the optical circuit and the optical signal processing device.

10. An optical signal processing apparatus comprising:
the optical circuit according to claim 1; and
a free space optical device including at least an optical signal processing device having a plurality of elements, each of the elements performing signal processing on optical signals from the optical circuit, wherein
focal positions of the optical signals on the free space optical device are aligned with an arrangement position of the optical circuit,
the PLC includes a slab waveguide and arrayed waveguides, and
a facet of the arrayed waveguides forms the aperture.

11. An optical circuit configured to input and output an optical signal to and from a space, the optical circuit comprising:
a planar lightwave circuit (PLC) comprising:
a substrate having a top surface;
a cladding layer formed on the substrate; and
an optical waveguide core formed in the cladding layer, the optical waveguide core having an aperture, the PLC having an angled polished facet through which the optical waveguide core inputs and outputs the optical signal to and from the space;
a reinforcement part extending upward from the PLC adjacent the aperture, the reinforcement part having a facet aligned with the angled polished facet of the PLC so that the facet of the reinforcement part and the angled polished facet of the PLC form an extended angled facet;
a lens that collimates or condenses the optical signal from or to the aperture of the optical waveguide core, the lens being one of a plano-convex lens and a cylindrical lens, the lens having a flat surface that is bonded to the extended angled facet such that the lens extends beyond the extended angled facet in both upward and downward directions.

12. The optical circuit according to claim 11, further comprising an adhesive layer positioned between the extended angled facet and the flat surface, the adhesive layer being filled with an adhesive that bonds the extended angled facet and the flat surface together.

13. The optical circuit according to claim 11, wherein the flat surface of the lens comprises a first portion extending upward beyond the extended angled facet and a second portion extending downward beyond the extended angled facet.

* * * * *